United States Patent Office 3,434,320
Patented Mar. 25, 1969

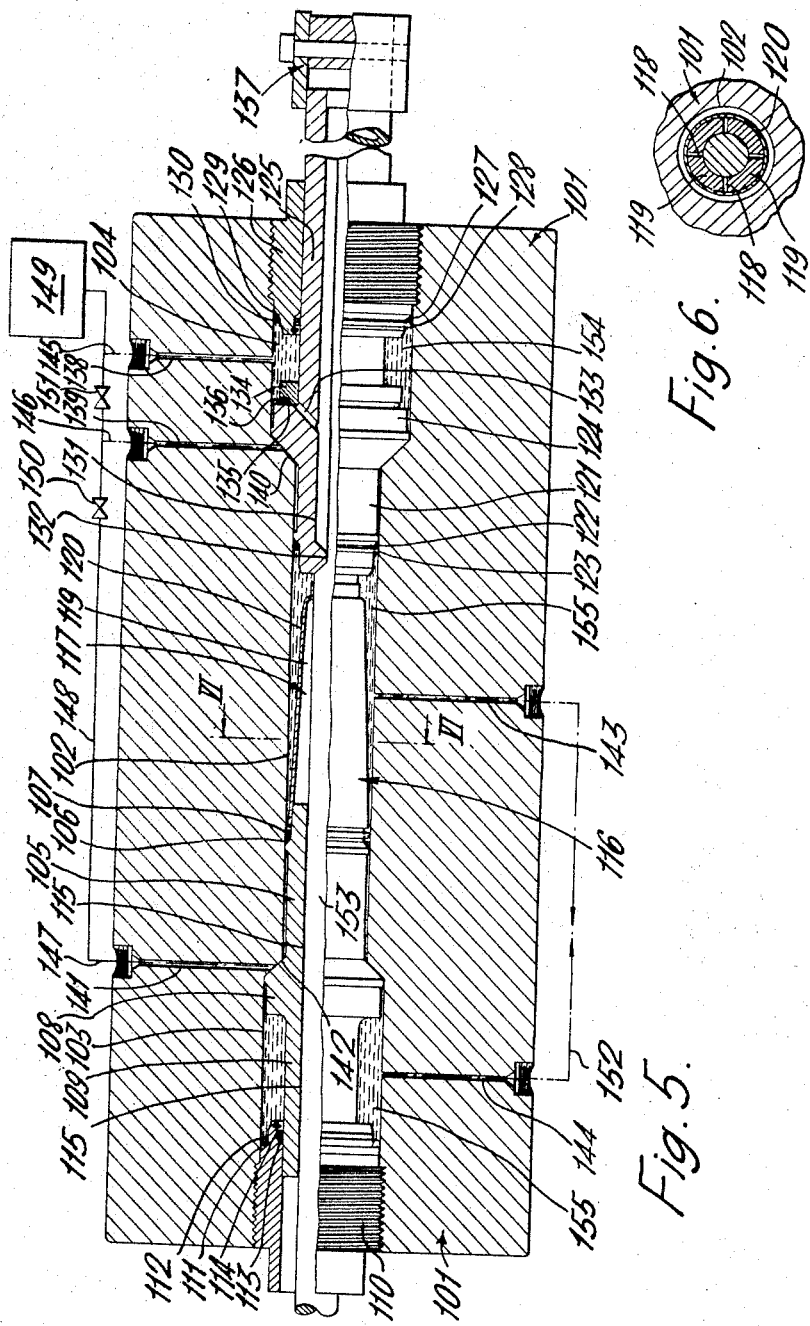

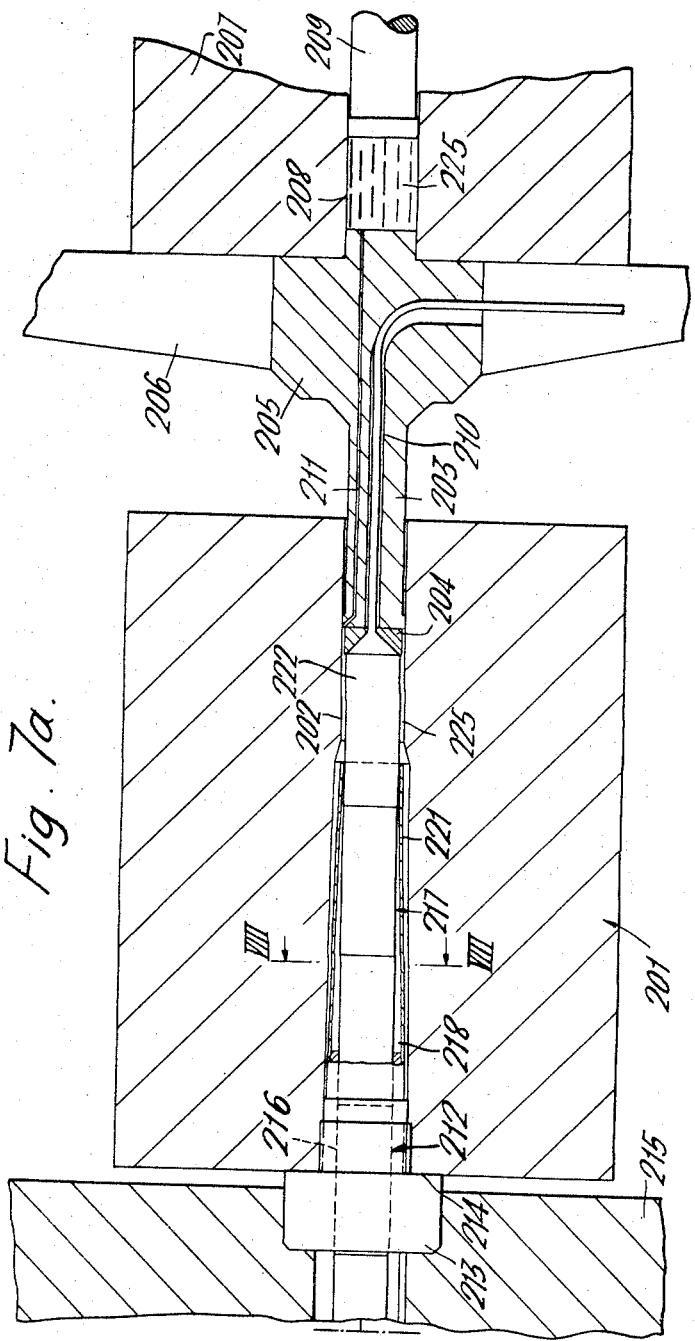

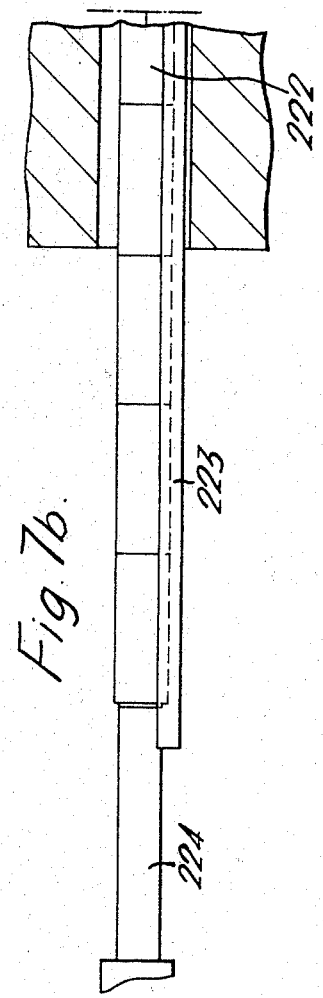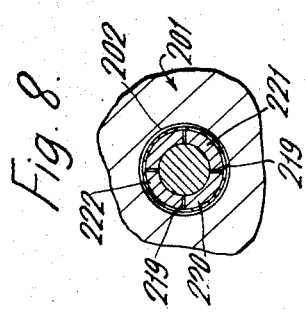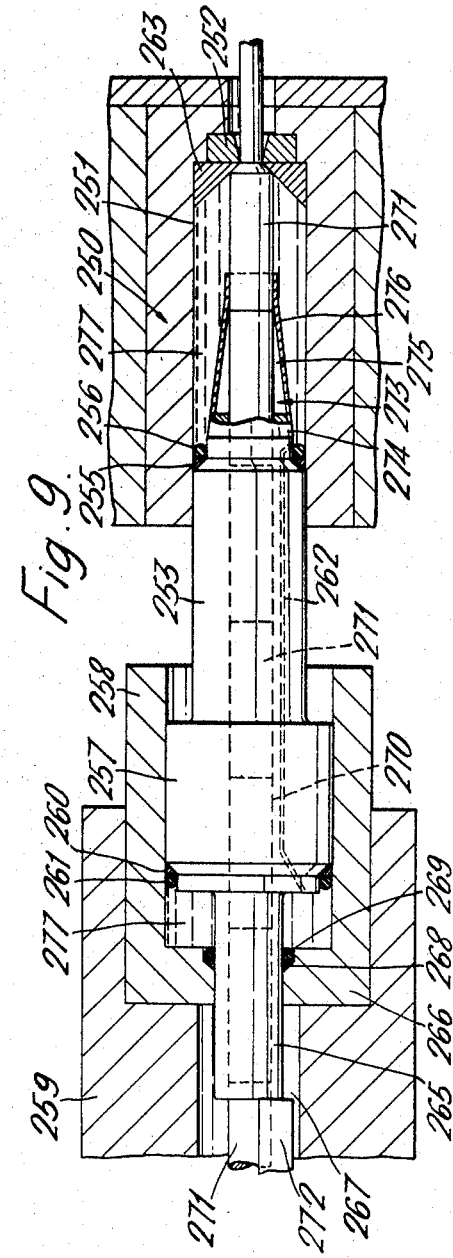

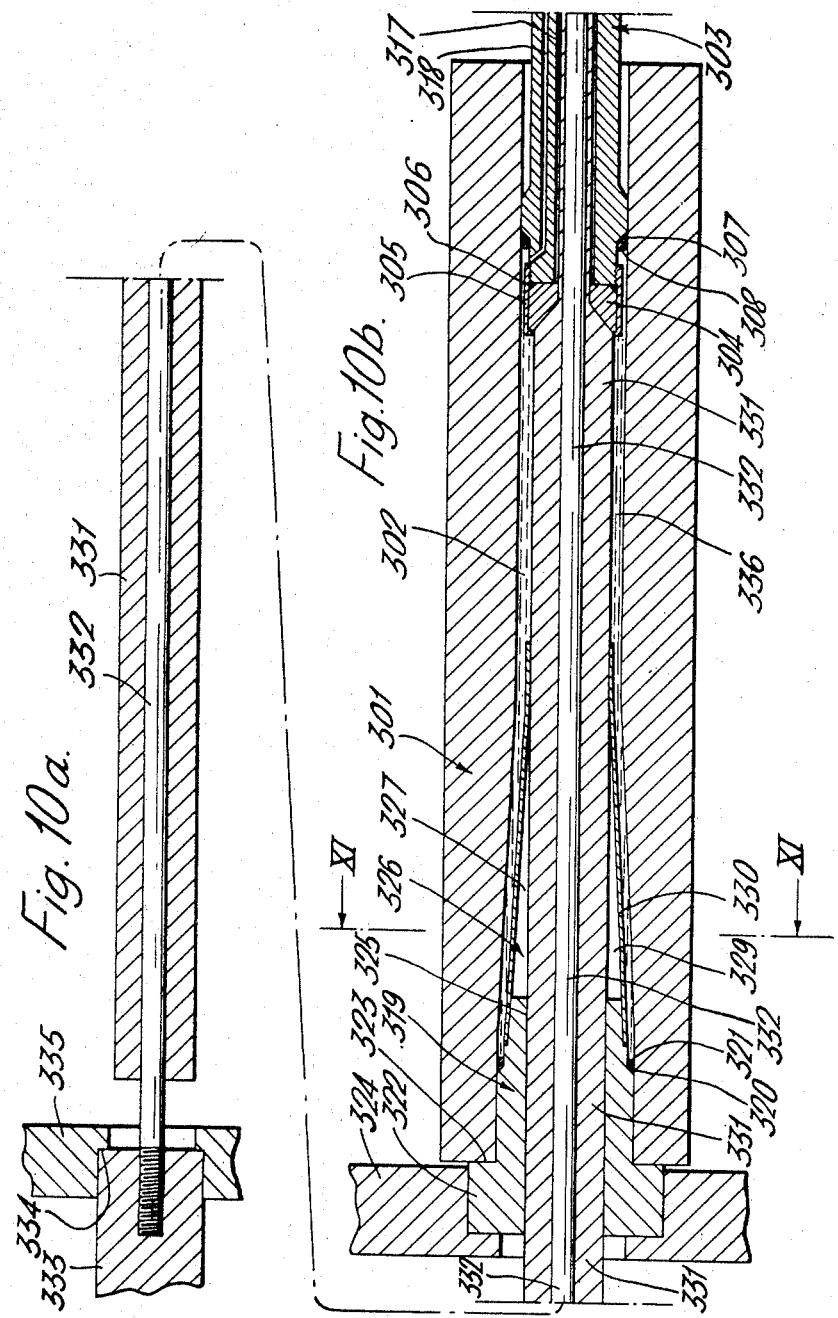

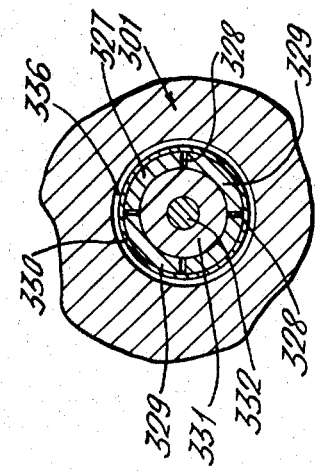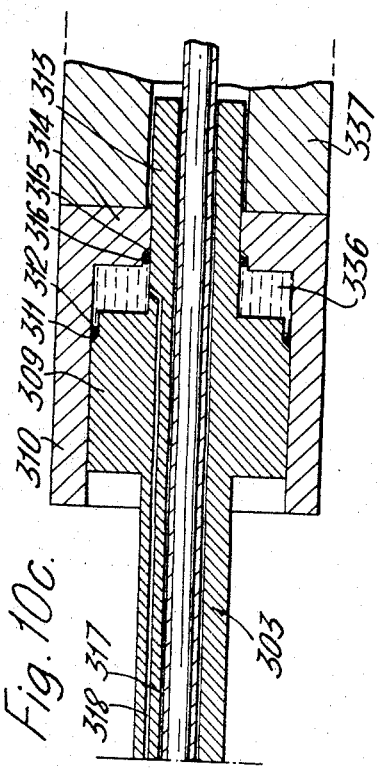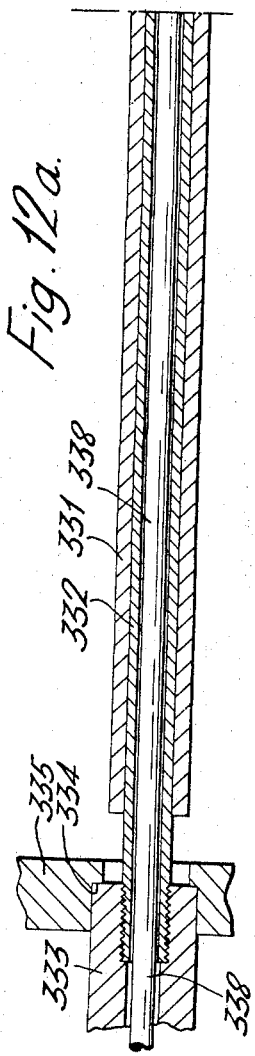

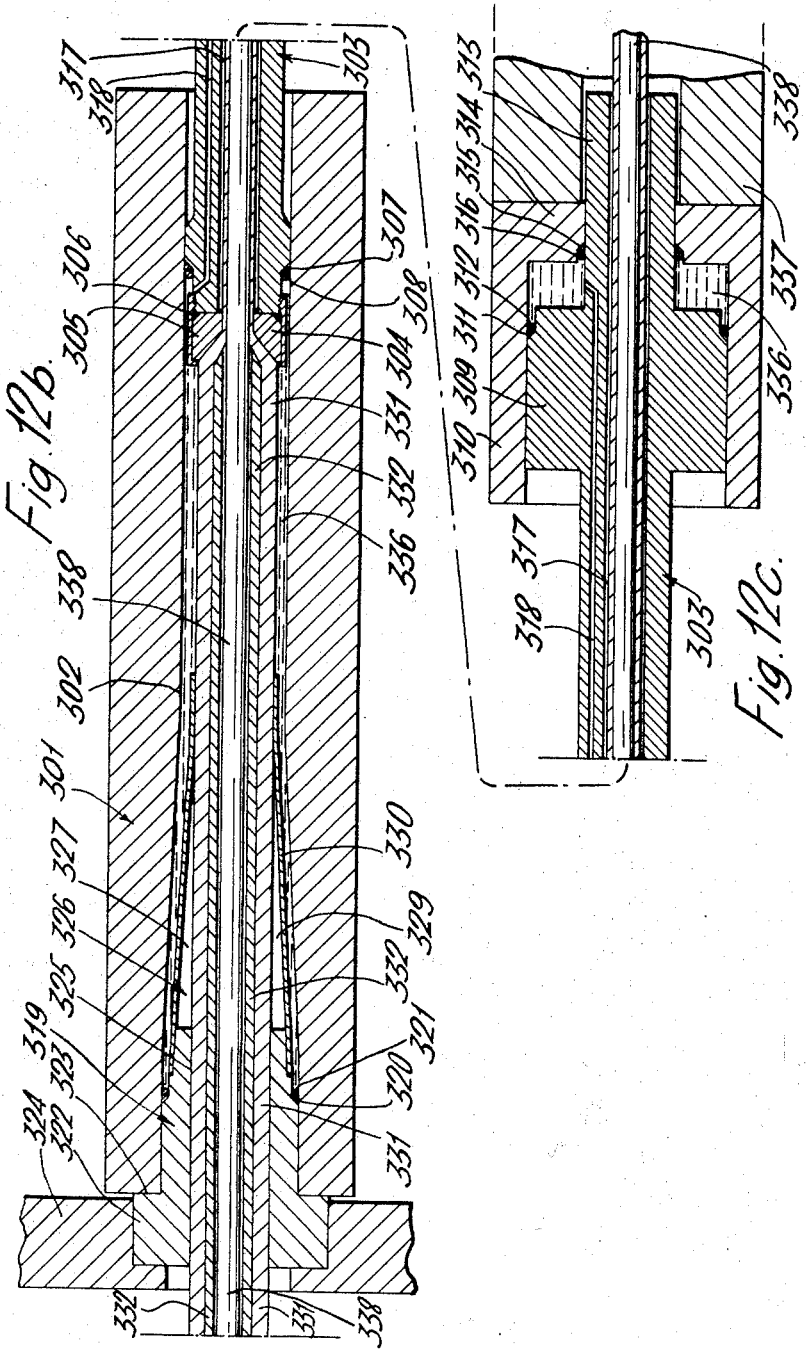

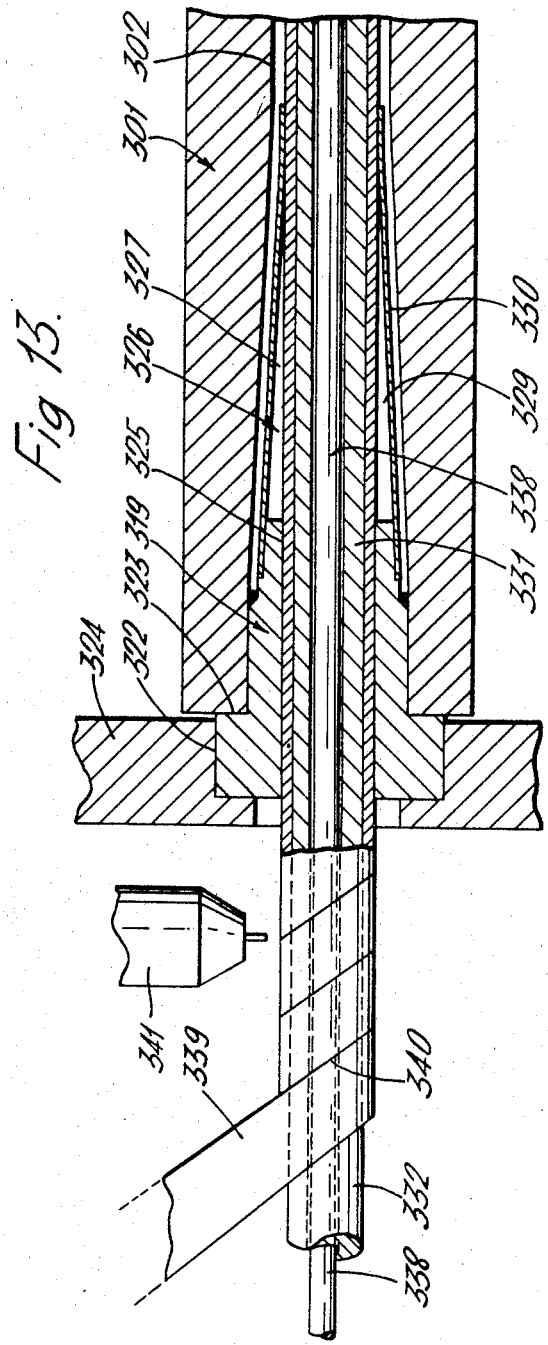

3,434,320
HYDROSTATIC EXTRUSION APPARATUS
Derek Green, Lytham St. Anne's, England, assignor to United Kingdom Atomic Energy Authority, London, England
Filed Jan. 23, 1967, Ser. No. 611,011
Claims priority, application Great Britain, Feb. 4, 1966, 4,982/66
Int. Cl. B21d 22/10; B21c 25/02, 33/00
U.S. Cl. 72—60         15 Claims

ABSTRACT OF THE DISCLOSURE

Hydrostatic extrusion apparatus wherein hydraulic liquid may be pressurised about a billet in the bore of an extrusion container to extrude the billet through a die located in the bore of the extrusion container. A tubular plug is sealed in the rear end of the bore of the extrusion container and a billet is fed into the extrusion container through the tubular plug.

Clamping and sealing means are provided between the tubular plug and the billet when inserted through the tubular plug into the bore of the extrusion container. In one arrangement the tubular plug is slidably sealed in the bore of the extrusion container to move into the bore to accommodate for shortening of the length of the billet as it is extruded.

Background of the invention

This invention relates to extrusion apparatus and in particular to apparatus for carrying out hydrostatic extrusion processes. In a conventional extrusion process a billet held within a container is subjected to a direct mechanical loading to extrude the billet from the container through a die. The billet is a close fit in the container and extrusion pressure is applied on the end face of the billet by a ram operating in the bore of the container. Hydrostatic extrusion has several advantages over conventional extrusion and differs from conventional extrusion in that a liquid is used to apply extrusion pressure on the billet. The liquid envelops the billet in an extrusion chamber and is pressurized to act directly on the billet. Because the liquid envelops the billet there is no frictional contact between the container and the billet.

Die friction is also reduced because the pressurized liquid adjacent the throat of the die provides hydrodynamic lubrication between the extruding material and the die.

Although the hydrostatic extrusion process has the above advantages compared with conventional extrusion it has the limitation, in general, of only being applicable to the extrusion of billets of short length. Extrusion chambers which are capable of withstanding the high internal pressure arising in a hydrostatic extrusion process can only practicably be made of short length which imposes a limitation on the length of billet which can be extruded by the process.

Summary of the invention

It is one object of the present invention to provide hydrostatic extrusion apparatus which does not subject limitations on the length of billet which can be extruded.

According to the invention apparatus for carrying out a hydrostatic extrusion process comprises an extrusion container having a longitudinal bore with an extrusion die sealed in the other end of the bore of the extrusion container, said plug member having a longitudinal passageway therethrough for entry of a billet through the plug member into the bore of extrusion container, means for pressuring liquid in the bore of the container, means for bleeding liquid from the bore of the extrusion container as a billet is extruded through the die, means for clamping the plug member in locked engagement about a billet at its point of entry into the extrusion chamber through the longitudinal passageway in the plug member, means for sealing between the billet and the end of the plug member inside the bore of the extrusion container, the plug member and the die being movable relatively one towards the other along the bore of the extrusion container during extrusion of a billet to accommodate for shortening of the length of the billet in the extrusion container as the billet is extruded.

In one form of apparatus in accordance with the invention the die is fixed in sealed engagement with one end of the bore of the extrusion container and the plug member is slidably sealed in the other end of the bore of the extrusion container, the plug member being movable along the bore of the extrusion container towards the die during extrusion of a billet to accommodate for shortening of the length of the billet in the extrusion container as the billet is extruded. In a second form of apparatus in accordance with the invention the plug member is in fixed sealed engagement with one end of the bore of the extrusion container and the die is slidably sealed in the bore of the extrusion container, the die being movable along the bore of the extrusion container towards the plug member during extrusion of a billet to accommodate for shortening of the length of the billet in the extrusion container as the billet is extruded.

In a third form of apparatus in accordance with the invention both the plug member and the die are slidably sealed in the bore of the extrusion container, the plug member and the die being relatively movable towards each other along the bore of the extrusion container during extrusion of a billet to accommodate for shortening of the length of the billet in the extrusion container as the billet is extruded.

The invention may particularly be embodied in apparatus such as is disclosed in copending British application No. 30,277/64, cognate with application No. 28,823/65 which relate to a hydrostatic extrusion process wherein the billet, as well as being subjected to a hydrostatic stress system by the pressurisation of liquid in a container surrounding the billet, is also subjected to a direct mechanical axial loading as in a conventional extrusion process.

According to this aspect of the invention extrusion apparatus comprises an extrusion container having a bore with an extrusion die sealed in one end of the bore, means for pressurisation of a hydraulic liquid in the bore of the extrusion container about a billet when contained therein, a plug member into and slidably sealed in the other end of the bore of the extrusion container, means for bleeding hydraulic liquid from the bore of the extrusion contained as extrusion of a billet proceeds, a longitudinal passageway being provided through the plug member whereby a billet may be entered into the bore of the extrusion container through the longitudinal passageway in the plug member, means for clamping the plug member in locked engagement about a billet at its point of entry into the extrusion container through the longitudinal passageway in the plug member, means for sealing between the billet and the end of the plug member inside the bore of the extrusion container and means for loading the plug member in the bore of the extrusion container towards the die to apply a mechanical axial loading on the length of the billet inside the extrusion container during extrusion of the billet and so that the plug member is caused to move along the bore of the extrusion container towards the die to accommodate for shortening of the length of the billet in the extrusion container as the billet is extruded.

Alternatively in accordance with the invention extrusion apparatus comprises an extrusion container having a bore with an extrusion die slidably sealed in one end of the bore, means for pressurisation of a hydraulic liquid in the bore of the extrusion container about a billet when contained therein, a plug member fitting and sealed in the other end of the bore of the extrusion container, means for bleeding hydraulic liquid from the bore of the extrusion container as extrusion of billet proceeds, said plug member having a longitudinal passageway therethrough for entry of a billet through the plug member into the bore of the extrusion container, means for clamping the plug member in locked engagement about a billet at its point of entry into the bore of the extrusion container through the longitudinal passageway in the plug member, means for sealing between the billet and the end of the plug member inside the bore of the extrusion container and means for loading the die in the bore of the extrusion container towards the plug member to apply a mechanical axial loading on the length of the billet inside the extrusion container during extrusion of the billet and so that the die is caused to move along the bore of the extrusion container towards the plug member to accommodate for shortening of the length of the billet in the extrusion container as the billet is extruded.

All the forms of apparatus disclosed above are suitable for the semicontinuous extrusion of billets which are of longer length than the extrusion container. Such a billet has its leading end entered into the extrusion container through the longitudinal passageway in the plug member. The leading end of the billet is extruded through the die by pressurisation of hydraulic liquid in the bore of the extrusion container about the leading end of the billet. Whilst extrusion of the leading end of the billet proceeds the plug member is held in clamped and sealed engagement with the billet.

In the forms of apparatus in which the plug member is slidably sealed in the bore of the extrusion container the plug member moves along the bore of the extrusion container towards the die as extrusion of the leading end of the billet proceeds. When the leading end of the billet has been extruded i.e. when the plug member reaches a position in the bore of the extrusion container adjacent the die the plug member is released from clamping and sealing engagement with the billet so that the plug member can be drawn back along the bore of the extrusion container to expose a new length of the billet in the bore of the container. The newly exposed length of the billet is then extruded. Repetition of this process enables extrusion of the full length of the billet.

In the forms of apparatus in which the die is slidably sealed in the bore of the extrusion container the billet is clamped and sealed in passage through the mixed plug member and as extrusion of the leading end of the billet proceeds the die moves along the bore of the extrusion container towards the plug member. When the leading end of the billet has been extruded the plug member is released from sealing and clamping engagement with the billet and the die is drawn back along the bore of the extrusion container to draw a new length of the billet through the passageway in the plug member into the bore of the extrusion container. The new length of the billet is then extruded and by repetition of the process the full length of the billet can be extruded.

As well as being applicable to the semicontinuous extrusion of billets which are longer than the length of the extrusion container, apparatus in accordance with the invention is also applicable for semicontinuous extrusion of an end to end abutting column of normal length billets. The end to end abutting column of billets is fed into the extrusion container through the longitudinal passageway in the plug member so that the leading billet in the column occupies the bore of the extrusion container. Whilst the leading billet in the column is extruded the plug member is held in clamped and sealed engagement either with the rear end of the leading billet or alternatively with the billet immediately following the leading billet in the column.

Apparatus in which the plug member or alternatively the die is slidably sealed in the bore of the extrusion container and can be loaded to apply a mechanical axial loading on a billet whilst it is extruded is particularly suitable for the feed and extrusion of a column of end to end abutting billets. The mechanical axial loading applied in the extrusion container on the billets ensures that the billets enter the bore of the container and are extruded in a continuous end to end abutting column.

Apparatus in accordance with the invention can be adapted for the production of tubing by the provision of a mandrel extending coaxially through the longitudinal passageway in the plug member into the bore of the extrusion container from a point of location outside the extrusion container. In this form of apparatus a tubular billet is entered into the extrusion container over the mandrel and is extruded through the extrusion die about the mandrel to produce a tubular extrusion.

Apparatus adapted in this manner can be further modified for the production of articles having a solid core enclosed within a sheath of a different material, the modification comprising the provision of a tubular mandrel extending coaxially through the longitudinal passageway in the plug member into the bore of the extrusion container from a point of location outside the extrusion container. In this form of apparatus core material is fed through the tubular mandrel from outside the extrusion container whilst a tubular billet is extruded through the extrusion die over the mandrel to enclose the core material as it is fed through the mandrel.

In all forms of apparatus in accordance with the invention the means for clamping the plug member about the billet and the means for sealing between the billet and the end of the plug member inside the bore of the extrusion container are preferably operated by the pressure of liquid applied in the extrusion container to exclude the billet.

Accordingly the invention also provides clamping and sealing means wherein the plug member has a conically tapered nose piece fitted with an elastic sealing sleeve which embraces the nose piece and extends beyond the end of the nose piece to grip about a billet extending from the longitudinal passageway in the plug member beyond the nose piece.

Preferably the nose piece is divided into segments by being slotted longitudinally.

When hydraulic liquid is pressurized in the bore of the extrusion container to cause extrusion of a billet from the extrusion container through the die the pressure of the hydraulic liquid acting on the outside surface of the elastic sealing sleeve results in sealing of the sleeve about the billet and the segments of the nose piece are forced radially inwards into clamping engagement with the billet.

*Description of the drawings*

The invention will now be described by way of example with reference to the accompanying drawings in which:

FIGURE 5 is a longitudinal sectional elevation of a second form of apparatus in accordance with the invention, FIGURE 6 is a cross section along the line VI—VI in FIGURE 1, FIGURES 7a and 7b are longitudinal sectional elevations showing the two associated halves of a third embodiment of the invention, FIGURE 8 is a cross section along the line VIII—VIII in FIGURE 7, FIGURE 9 is a longitudinal sectional elevation of a fourth embodiment of the invention, FIGURES 10a, 10b and 10c are longitudinal sectional elevations of the three related parts of a fifth form of apparatus in accordance with the invention, FIGURE 11 is a cross sectional detail along the line XI—XI in FIGURE 10b, FIGURES 12a, 12b and 12c are longitudinal sectional elevations of the three related parts of a sixth form of apparatus in accordance with the invention, FIGURE 13 is a longitudinal sectional elevation illustrating a modified way of using the form of apparatus as shown in FIGURES 12a, 12b and 12c.

Description of the preferred embodiments

Figure 1:
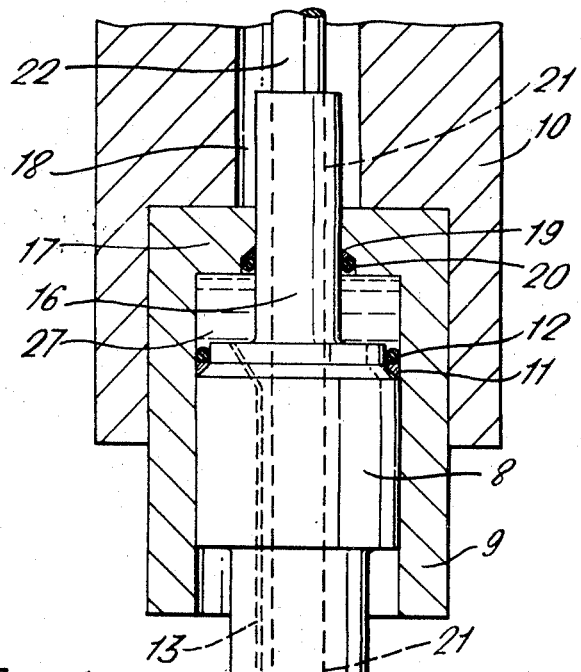
FIGURE 1 is a longitudinal sectional elevation of one form of extrusion apparatus embodying features in accordance with the invention.
Figure 1:
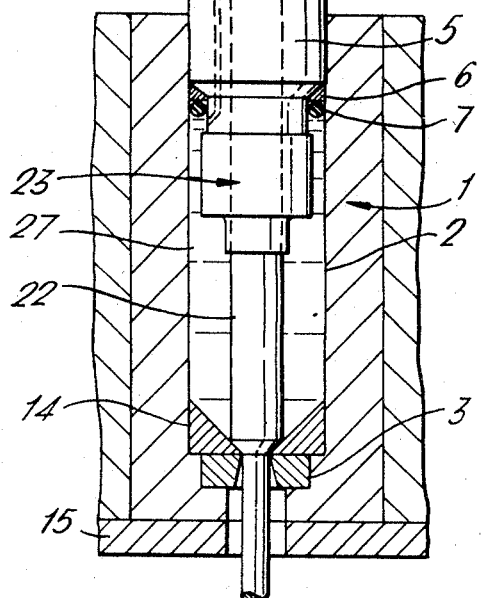

The apparatus shown in FIGURE 1 of the drawings comprises a cylindrical extrusion chamber 1 having a bore 2 fitted with a die 3 at its lower end. A plunger 4 is entered into the bore 2 of the extrusion chamber 1. The plunger 4 is sealed in the bore 2 of the extrusion chamber 1 by a copper mitre ring 6 and a rubber O ring 7. The plunger 4 has a larger diameter head 8 which operates in a cylinder 9 mounted in the ram 10 of a hydraulic press. The head 8 of the plunger 4 is slidably sealed in the cylinder 9 by a copper mitre ring 11 and a rubber O ring 12. A passageway 13 for liquid is formed through the plunger 4 and its head 8 leading from the cylinder 9 to the bore 2 of the extrusion chamber 1. The die 3 is provided with a lead-in ring 14 and the extrusion chamber 1 is mounted on the base 15 of the hydraulic press.

The plunger 4 has a tail-piece 16 which extends rearwardly from the head 8. The tail-piece 16 projects through the end wall 17 of the cylinder 9 into a central bore 18 in the ram 10 of the hydraulic press. The tail-piece 16 of the plunger 4 is slidably sealed in passage through the end wall 17 of the cylinder 9 by a copper mitre ring 19 and a rubber O ring 20. A longitudinal passageway 21 extends end to end through the plunger 4. For extrusion a billet 22, of greater length than the length of the extrusion chamber 1, has its leading end entered into the bore 2 of the extrusion chamber 1 through the longitudinal passageway 21 in the plunger 4. The plunger 4 is clamped in locked engagement with the billet 22 during extrusion by an assembly 23 mounted on the end of the plunger 4 inside the bore 2 of the extrusion chamber 1. The assembly 23 also provides a seal between the billet 22 and the end of the plunger 4 during extrusion of the billet 22.

Figure 2:
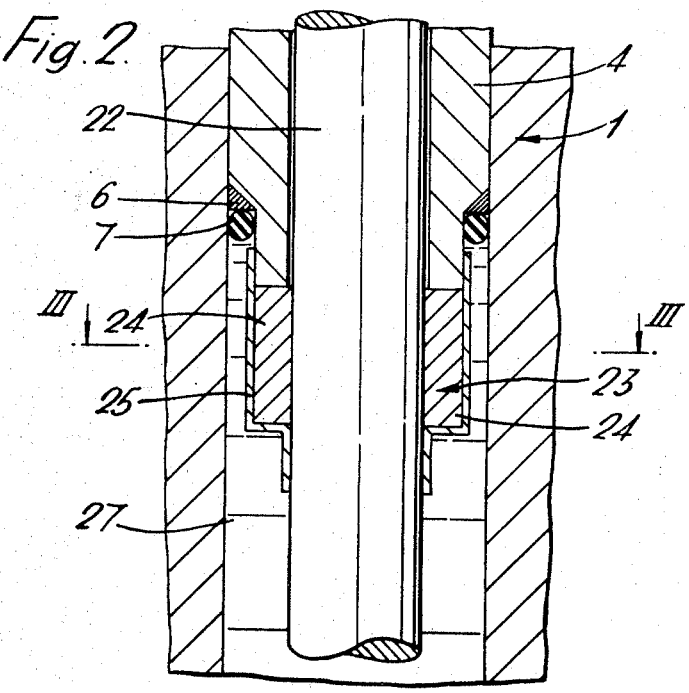
FIGURE 2 is a sectional detail of the apparatus shown in FIGURE 1.
Figure 3:
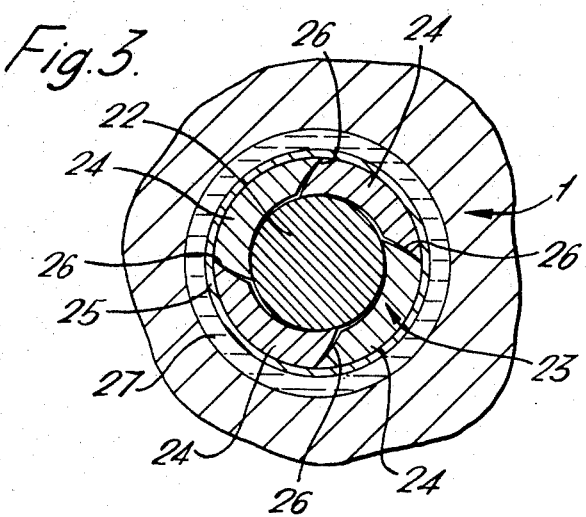
FIGURE 3 is a cross section along the line III—III in FIGURE 2.

As shown in FIGURES 2 and 3 the assembly 23 comprises four clamping jaws 24 contained within a rubber sleeve 25. The sleeve 25 engages in a sealing manner about the end of the plunger 4 and about the billet 22. The clamping jaws 24 have mating longitudinal faces 26 which are inclined to the radial direction when the jaws 24 are viewed in cross section (see FIGURE 3). This "iris" type of construction ensures clamping engagement of the jaws 24 about billets of irregular cross section.

In use of apparatus as shown in FIGURE 1 both the space in the cylinder 9 above the head 8 of the plunger 4 and the space in the extrusion chamber 1 surrounding the billet 22 are filled with hydraulic liquid 27. The ram 10 of the hydraulic press is forced downwards so that the hydraulic liquid 27 in the cylinder 9 is pressurized. As the cylinder 9 is connected with the bore 2 of the extrusion chamber 1 by the passageway 13, the hydraulic liquid surrounding the billet 22 in the extrusion chamber 1 is pressurized to the same degree as the hydraulic liquid 27 in the cylinder 9.

Pressure of the hydraulic liquid in the extrusion chamber 1 effects sealing of the rubber sleeve 25 about the end of the plunger 4 and about the billet 22. The pressure of the hydraulic liquid in the extrusion chamber 1 acting on the rubber sleeve 25 also forces the jaws 24 of the assembly 23 radially inwards into clamping engagement with the billet 22. The pressure of hydraulic liquid in the cylinder 9 acts on the head 8 of the plunger 4 to apply a downwards loading on the plunger 4. The amount of downwards loading applied on the plunger 4 depends on the area of the annular end face of the head 8 of the plunger 4 which is exposed to the pressure of hydraulic liquid in the cylinder 9. The downwards loading which is applied on the plunger 4 acts in part to counterbalance the upwards force applied on the plunger due to the pressure of the hydraulic liquid in the extrunion chamber 1 acting on the exposed area of the lower end face of the plunger 4 in the extrusion chamber 1.

The relative dimensions of the plunger 4 and its head 8 may be made such that the downwards loading applied on the plunger 4 is greater than required to counterbalance the upwards force acting in the plunger 4. In such a case the length of the billet 22 in the extrusion chamber 1 below the clamping assembly 23 will be subjected to a mechanical axial loading in addition to being subjected to the pressure of hydraulic liquid in the extrusion chamber 1. The length of the billet 22 in the extrusion chamber is extruded through the die 3 under the combined effect of the pressure of the hydraulic liquid in the chamber 1 and the mechanical axial loading applied by the plunger 4. As extrusion proceeds the plunger 4 moves into the bore of the extrusion chamber 1, hydraulic liquid being expelled from the extrusion chamber 1 through the passageway 13 in the plunger 4 into the cylinder 9 above the head 8 of the plunger 4. Extrusion is terminated when the lower end of the plunger 4 reaches a position near to the lead-in ring 14. The loading applied by the ram 10 is now released so that pressure in the hydraulic liquid in the cylinder 9 and in the bore of the extrusion chamber, falls to zero. Thus clamping pressure is released from the jaws 24 of the clamping assembly 23 and the plunger 4 can be raised in the extrusion chamber 1 to expose a new length of the billet 22 in the extrusion chamber 1. Thus the assembly is brought back to the condition shown in FIGURE 1 ready for recommencement of extrusion of a further length of the billet 22. Any length of billet can be extruded by repetition of the process by the number of stages required to extrude the billet or when the major part of a billet has been extruded a new length of billet may be joined onto the tail of the partially extruded billet such as by welding. Repeated addition of new lengths of billet to the partially extruded length of billet enables the production of a continuous length of extrusion.

Figure 4:
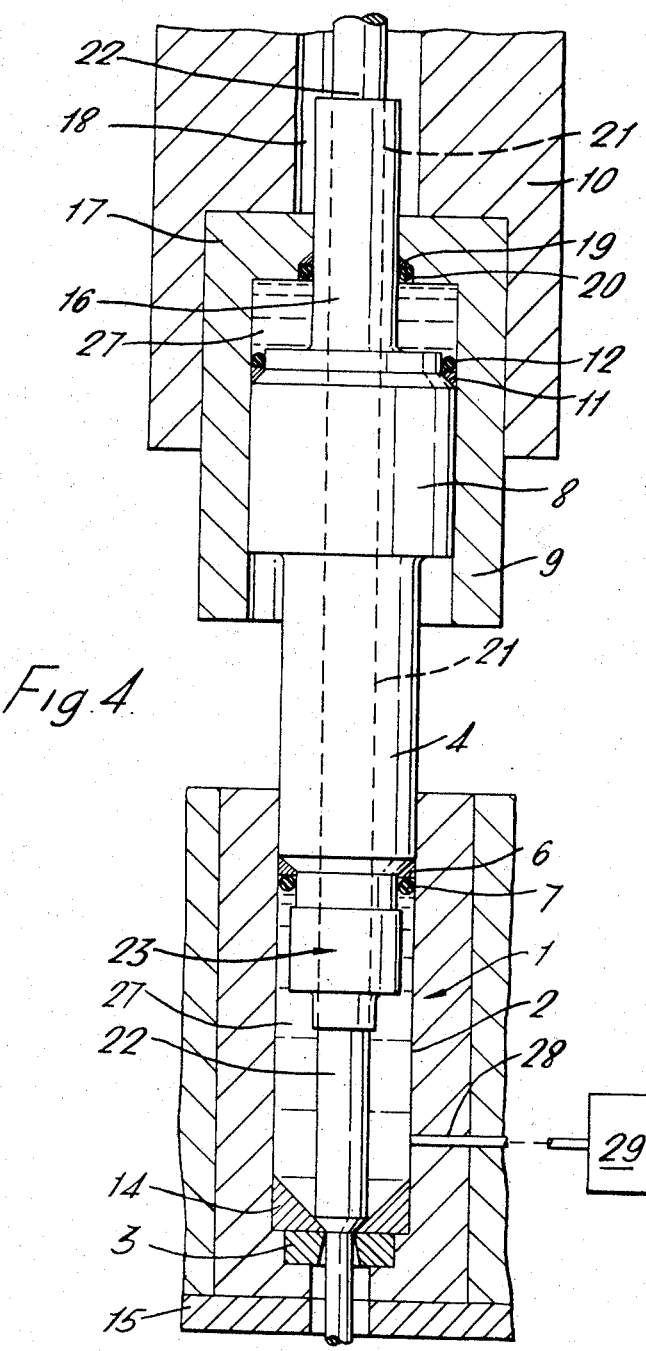
FIGURE 4 is a longitudinal sectional elevation of a modified form of the apparatus shown in FIGURE 1.

The arrangement shown in FIGURE 4 is very similar to that shown in FIGURE 1 and identical parts are shown with the same reference numerals in the two arrangements.

However in the arrangement of FIGURE 4 the plunger 4 does not have the passageway 13 such as exists in the plunger 4 of the arrangement of FIGURE 1. In addition in the arrangement of FIGURE 4 a cross bore outlet passageway 28 is provided from the bore of the extrusion chamber 1, the passageway 28 being connected to a constant pressure bleed device 29. The operation of the arrangement of FIGURE 4 is similar to the operation of the arrangement of FIGURE 1 but in the arrangement of FIGURE 4 as extrusion proceeds hydraulic liquid 27 is expelled from the bore of the extrusion chamber 1 through the passageway 28 and the constant pressure bleed device 29.

The arrangement shown in FIGURES 5 and 6 of the drawings comprises an extrusion container 101 having an axial bore 102. The bore 102 opens out into a cylinder 103 at one end and into a cylinder 104 at its other end.

A plunger 105 is slidably sealed in the bore 102 by a copper mitre ring 106 and a rubber O ring 107. The plunger 105 has a head 108 which is a sliding fit in the cylinder 103. A tail piece 109 extends rearwards from the head 108 of the plunger 105. The tail piece 109 passes through a tubular plug 110 which is screwed into the end of the cylinder 103. The plug 110 is sealed in the cylinder 103 by a copper mitre ring 111 and a rubber O ring 112. The tail piece 109 is slidably sealed in passage through the plug 110 by a copper mitre ring 113 and a rubber O ring 114. A passageway 115 passes axially through the plunger 105, its head 108 and tail piece 109. The plunger 105 has associated clamping and sealing means 116. The clamping and sealing means 116 comprise a conically tapered nose piece 117 integral with the plunger 105. As shown in FIGURE 6 the nose piece 117 is divided, by longitudinal slots 118, into four longitudinal segments 119. The segments 119 are enclosed by a rubber sheath 120.

A plunger 121 is slidably sealed in the other end of the bore 102 in the container 101 by a copper mitre ring 122 and a rubber O ring 123. The plunger 121 has a head 124 which is a sliding fit in the cylinder 104. A tail piece 125 extends from the head 124 of the plunger 121 through a tubular plug 126 which is screwed into the end of the cylinder 104. The plug 126 is sealed in the cylinder 104 by a copper mitre ring 127 and a rubber O ring 128. The tail piece 125 of the plunger 121 is slidably sealed in passage through the plug 126 by a copper mitre ring 129 and a rubber O ring 130. The plunger 121 has an axial bore which is reduced in diameter at the nose of the plunger 121 to form a die orifice 132. A transverse drilling 133 through the head 124 of the plunger 121 provides for connection between the bore 131 of the plunger 121 and the cylinder 104 behind the head 124 of the plunger 121. The drilling 133 is normally closed by a blanking ring 134 which seats at the junction of the tail piece 125 with the head 124 of the plunger 121. The blanking ring 134 is sealed against the head 124 of the plunger 121 by a copper mitre ring 135 and a rubber O ring 136. The end of the tail piece 125 outside the extrusion container 101 has a breech mechanism 137.

A cross bore 138 in the extrusion container 101 connects with the cylinder 104 behind the head 124 of the plunger 121. A cross bore 139 connects with the cylinder 104 forward of the front end face 140 of the head 124 of the plunger 121. A cross bore 141 connects with the cylinder 103 forward of the front end face 142 of the head 108 of the plunger 105. A cross bore 143 connects with the bore 102 of the extrusion container 101 between the two plungers 105 and 121. A cross bore 144 connects with the cylinder 103 behind the head 108 of the plunger 105.

Feed lines 145, 146 and 147 connect respectively with the cross bores 138, 139 and 141. The feed lines 145, 146 and 147 connect with a common manifold line 148 which leads from a source of pressurised hydraulic liquid. An isolating valve 150 is provided in the manifold line 148 between the feed lines 146 and 147. A second isolating valve 151 is provided in the manifold line 148 between the feed lines 145 and 146. The cross bores 143 and 144 are connected by a line 152.

In FIGURES 5 and 6 the apparatus is shown in the condition at termination of an extrusion cycle.

For commencement of an extrusion cycle the plunger 105 is drawn back to the left in the cylinder 103 and the plunger 121 is drawn back to the right in the cylinder 104. A billet 153 is entered into the bore 102 of the extrusion container 101 through the passageway 115 in the plunger 105.

Hydraulic liquid 154 in the cylinder 104 behind the head 124 of the plunger 121 is pressurised by connection with the source of pressurised hydraulic liquid 149. Connection of the cylinder 104 with the source 149 is through the cross bore 139 and the lines 145 and 148, the valves 150 and 151 being closed. The pressure of the hydraulic liquid 154, acting on the head 124 of the plunger 121 in the cylinder 104 loads the plunger 121 to pressurise hydraulic liquid 155 surrounding the billet 153 in the bore 102 of the extrusion container 101. The annular end face of the head 124 of the plunger 121, which is exposed to the pressure of the hydraulic liquid 154 in the cylinder 104 is of larger area than the cross sectional area of the bore 102. Therefore the hydraulic liquid 155 surrounding the billet 153 in the bore 102 is raised to a higher pressure than the pressure of the hydraulic liquid 154 in the cylinder 104. The pressure of the hydraulic liquid 155 in the bore 102 acts on the outside of the rubber sheath 120 of the clamping and sealing means 116. Thus the rubber sheath 120 is held in sealing engagement about the billet 153. The pressure of the hydraulic liquid 155 acting on the outside of the sheath 120 also forces the longitudinal segments 119 of the clamping and sealing means 116 radially inwards into clamping engagement with the billet 153.

The pressure of the hydraulic liquid 155 in the bore 102 is transmitted through the cross bore 143, the line 152 and the cross bore 144 to hydraulic liquid 155 in the cylinder 103 behind the head 108 of the plunger 105. The annular end face of the head 108 of the plunger 105, which is exposed to the pressure of the hydraulic liquid 155 in the cylinder 103, is of larger area than the cross sectional area of the bore 102 in the extrusion container 101. Thus the plunger 105 is loaded along the bore 102 towards the plunger 121. Thus the leading end of the billet 153 in the bore 102 of the container 101 is subjected to an axial compressive loading by the plunger 105.

The pressure of the hydraulic liquid 155 acting on the leading end of the billet 153 in the bore 102 and the axial compressive loading applied on this length of the billet 153 by the loading of the plunger 105 sets up stress conditions in the billet 153 at the entry of the die orifice 132 such that the billet 153 is extruded through the die orifice 132 into the axial bore 131 in the plunger 121. As extrusion of the billet proceeds the plungers 105 and 121 move towards each other along the bore 102 of the container 101, hydraulic liquid 155 being transferred from the bore 102 through the cross bore 143, the line 152 and the cross bore 144 into the cylinder 103 behind the head 108 of the plunger 105. Extrusion is terminated when the plungers 105 and 121 reach their fully advanced positions in the bore 2, as shown in FIGURE 5.

The valves 150 and 151 are now opened so that pressurised hydraulic liquid is supplied from the source 149 into the cross bores 139 and 141. The hydraulic liquid supplied to the cross bore 139 acts on the front end face 140 of the head 124 of the plunger 121 so as to counterbalance the pressure of the hydraulic liquid 154 acting in the cylinder 104 on the head 124 of the plunger 121. Thus pressure in the hydraulic liquid 155 contained by the bore 102 drops to zero and the clamping and sealing means 116 are released. The pressure of the hydraulic liquid applied to the front end face 140 of the head 124 of the plunger 121 retracts the plunger 121 from the bore 102 so that a new length of the billet 153 is drawn through the plunger 105 into the bore 102 of the container 101. At the same time the hydraulic liquid supplied to the cross bore 141 acts on the front end face 142 of the head 108 of the plunger 105 so that the plunger 105 is retracted from the bore 102. As the plunger 105 is retracted hydraulic liquid 155 is transferred back from the cylinder 103 into the bore 102 of the container 101 through the cross bore 144, the line 152 and the cross bore 143. The apparatus is now in condition for commencement of a further extrusion cycle. When the billet 153 has been fully extruded by performance of the required number of extrusion cycles the extruded product is removed from the axial bore 131 in the plunger 121 through the breech mechanism 137.

The degree of axial compressive loading applied on the leading end of the billet 153 by the plunger 105 can be varied by supply of hydraulic liquid under pressure into the cross bore 141 as extrusion of the billet proceeds. The hydraulic liquid supplied to the cross bore 141 acts on the front end face 142 of the head 108 of the plunger 5. The hydraulic liquid is supplied at a pressure sufficient to counterbalance a required amount of the loading applied on the billet 153 by the plunger 105.

The apparatus can also be operated so that the billet extrudes into hydraulic liquid under pressure in the axial bore 131 of the plunger 121. This enables the extrusion of brittle materials as extrusion of such materials into a liquid under pressure achieves a sound extrusion without the cracking which normally occurs in the material when extruded into atmosphere.

To achieve extrusion of the billet into a back pressure of hydraulic liquid in the axial bore 131 of the plunger 121 the blanking ring 134 is removed from the plunger 121. Thus, as the axial bore 131 in the plunger 121 is connected with the cylinder 104 by the transverse drilling 133, hydraulic liquid in the bore 131 is subjected to the same pressure as the hydraulic liquid 154 in the cylinder 104 and the billet 153 is extruded into the back pressure of this liquid in the bore 131 of the plunger 121.

The form of apparatus shown in FIGURES 7a and 7b comprises an extrusion container 201 having a longitudinal bore 202. A plunger 203 entered into one end of the bore 202 carries an extrusion die 204. The plunger 203 has a head 205 which is fitted in a movable cross head 206. The cross head 206 carries a cylinder 207, the head 205 of the plunger 203 being in sealed engagement with the bore 208 of the cylinder 207. A liquid pressurising ram 209 operates in the bore 208 of the cylinder 207. A longitudinal passageway 210 extends axially through the plunger 203 and passes radially outwards through the head 205 of the plunger 203. A passageway 211 for liquid, extending longitudinally through the plunger 203, connects the bore 208 of the cylinder 207 with the bore 202 of the extrusion container 201.

The other end of the bore 202 of the extrusion container 201 is sealed by a plug memebr 212. The plug member 212 has a head 213 which is clamped between the end face 214 of the extrusion container 201 and a cross head 215. A longitudinal passageway 216 extends axially through the plug member 212 and the plug member 212 has associated clamping and sealing means 217. The clamping and sealing means 217 comprise a conically tapered nose piece 218 integral with the plug member 212. The nose piece 218 is divided by longitudinal slots 219, into four longitudinal segments 220. The segments 220 are enclosed by a rubber sheath 221.

In use of the apparatus shown in FIGURES 7 and 7b, an end to end abutting stream of billets 222 is fed into the bore 202 of the extrusion chamber 201 through the longitudinal passageway 216 into the plug member 212. The billets 222 are fed along a channel 223 by a pusher ram 224.

For extrusion of the leading billet 222 through the die 203 the ram 209 of the cylinder 207 is driven to pressurise hydraulic liquid 225 in the bore 208 of the cylinder 207. The pressure generated in this hydraulic liquid 225 is transmitted through the passageway 211 in the plunger 203 to hydraulic liquid 225 surrounding the leading billet 222 in the bore 202 of the extrusion container 201.

As the cylinder 207 is freely movable on the ram 209 an axial compressive loading is applied by the plunger 203 on the billet 222 in the extrusion container 201. The pressure of the hydraulic liquid 225 acting on the billet 222 in the extrusion chamber 201 in combination with the axial loading applied on the billet 222 by the plunger 203 sets up stress conditions in the billet 222 at the entry of the die 204 so as to cause extrusion of the billet 222 through the die 204. As extrusion of the billet 222 proceeds the cylinder 207 with the cross head 206 and the plunger 203 advances on the ram 209 towards the extrusion container 201 so that the plunger 203 moves into the bore 202 of the extrusion container 201. As the plunger 203 moves into the bore 202 of the extrusion container 201 hydraulic liquid 225 is transferred through the passageway 211 in the plunger 203 from the bore 202 of the extrusion container 201 onto the bore 208 of the cylinder 207. The extruded length of the billet 222 passes along the axial passageway 210 in the plunger 203 and radially outwards through the head 205 of the plunger 203. The pressure of the hydraulic liquid in the bore 202 of the extrusion container 201 acts on the outside of the sheath 221 of the clamping and sealing means 217 so that the sheath 221 is pressed into sealing engagement with the rear end of the leading billet 222 whilst it is being extruded through the die 203. Pressure of the hydraulic liquid 225 acting on the outside of the sheath 221 also forces the segments 220 of the nose piece 218 into clamping engagement with the end of the leading billet 222 and also into clamping engagement with the succeeding billets 222 contained in the passageway 210 in the plug member 212. Extrusion is terminated when a short length of the leading billet 222 remains in the bore 202 of the extrusion container 201. Pressure in the hydraulic liquid 225 in the bore 202 of the container 201 and in the bore 208 of the cylinder 207 is released by release of the loading applied on the liquid pressurising ram 209. The plunger 203 with the cross head 206 and the cylinder 207 can now be drawn back from the bore 202 of the extrusion container 201 over the pressurising ram 209 and in doing this hydraulic liquid 225 is transferred from the bore 208 of the cylinder 207 to the bore 202 of the extrusion container 201 through the longitudinal passageway 211 in the plunger 203. Release of pressure in the hydraulic liquid 225 contained in the bore 202 of the extrusion container 201 renders the clamping and sealing means 217 inoperative and the pusher ram is operated to push the row of billets along the channel 223 to expose the next billet 222 in the bore 202 of the extrusion container 201.

The apparatus shown in FIGURE 9 of the drawings comprises a clindrical extrusion chamber 250 having a bore 251 fitted at one end with a die 252. A plunger 253 is entered into the bore 251 of the extrusion chamber 250. The plunger is sealed in the bore 251 of the extrusion chamber 250 by a copper mitre ring 255 and a rubber O ring 256. The plunger 253 has a larger diameter head 257 which operates in a cylinder 258 mounted in the ram 259 of a hydraulic press. The head 257 of the plunger 253 is slidably sealed in the cylinder 258 by a copper mitre ring 260 and a rubber O ring 261. A passageway 262 for liquid is formed through the plunger 253 and its head 257 leading from the cylinder 258 to the bore 251 of the extrusion chamber 250. The die 252 is provided with a lead in ring 263.

The plunger 253 has a tail-piece 265 which extends rearwardly from the head 257. The tail-piece 265 projects through the end wall 266 of the cylinder 258 into a central bore 267 in the ram 259 of the hydraulic press. The tail-piece 265 of the plunger 253 is slidably sealed in passage through the end wall 266 of the cylinder 258 by a copper mitre ring 268 and a rubber O ring 269. A longitudinal passageway 270 extends end to end through the plunger 253. For extrusion an end to end abutting row of billets 271 is fed from a channel 272 through the passageway 270 in the plunger 253 into the bore 251 of the extrusion chamber 250. The plunger 253 has associated clamping and sealing means 273 which, similarly to the clamping and sealing means 217 in the arrangement of FIGURES 7a and 7b, comprise a conically tapered nose piece 274 integral with the plunger 253, the nose piece 274 being divided into four longitudinal segments 275 which are enclosed by a rubber sheath 276.

In use of apparatus as shown in FIGURE 9 both the space in the cylinder 258 above the head 257 of the plunger 253 and the space in the extrusion chamber 250 surrounding the leading billet 271 are filled with hydraulic liquid 277. The ram 259 of the hydraulic press is loaded so that the hydraulic liquid 277 in the cylinder 258 is pressurised. As the cylinder 258 is connected with the bore 251 of the extrusion chamber 250 by the passageway 262, the hydraulic liquid surrounding the billet 271 in the extrusion chamber 250 is pressurised to the same degree as the hydraulic liquid 277 in the cylinder 258.

Pressure of the hydraulic liquid in the extrusion chamber 250 effects sealing of the rubber sheath 276 of the clamping and sealing means 173 about the end of the leading billet 271. The pressure of the hydraulic liquid in the extrusion chamber 250 acting on the rubber sheath 276 also forces the segments 275 of the clamping and sealing means 273 radially inwards into clamping engagement with the billet 271 and also into clamping engagement with the succeeding billet 271 contained in the passageway 270 in the plunger 253. The pressure of hydraulic liquid in the cylinder 258 acts on the head 257 of the plunger 253 to apply a downwards loading on the plunger 253 and hence an axial compressive loading on the leading billet 271. The amount of loading applied on the plunger 253 depends on the area of the annular end face of the head 257 of the plunger 253 which is exposed to the pressure of hydraulic liquid in the cylinder 258. The loading which is applied on the plunger 253 acts in part to counterbalance the upwards force applied on the plunger due to the pressure of the hydraulic liquid in the extrusion chamber 250 acting on the exposed area of the end face of the plunger 253 in the extrusion chamber 250.

The relative dimensions of the plunger 253 and its head 257 may be made such that the loading applied on the plunger 253 is greater than required to counterbalance the force acting on the plunger 283. In such a case the billet 271 in the extrusion chamber forward of the clamping and sealing means 273 will be subjected to a mechanical axial loading in addition to being subjected to the pressure of hydraulic liquid in the extrusion chamber 250. The billet 271 in the extrusion chamber is extruded through the die 252 under the combined effect of the pressure of the hydraulic liquid in the chamber 250 and the mechanical axial loading applied by the plunger 253. As extrusion proceeds the plunger moves into the bore of the extrusion chamber 250, hydraulic liquid being expelled from the extrusion chamber 250 through the passageway 262 in the plunger 253 into the cylinder 258 behind the head 257 of the plunger 253. Extrusion is terminated when a short end of the billet 271 remains in the chamber 250. The loading applied by the ram 259 is now released so that the pressure in the hydraulic liquid in the cylinder 258 and in the bore 251 of the chamber 250, falls to zero. Thus the clamping and sealing means 273 are made inoperative. The plunger 253 is withdrawn in the bore 251 of the extrusion chamber 250 and the row of billets 271 is fed along the channel 222 through the passageway 270 in the planger 253 to expose the next billet in the row for extrusion from the chamber 250.

The apparatus shown in FIGURES 10a, 10b and 10c of the drawings comprises an extrusion container 301 having a longitudinal bore 302. A plunger 303 entered into one end of the bore 302 carries an extrusion die 304. The die is held by a retaining sleeve 305 screwed on the end of the plunger 303 and is sealed against the end face of the plunger 303 by a copper mitre ring 306. The plunger 303 is slidably sealed in the bore 302 by a copper mitre ring 307 and a rubber O ring seal 308.

The plunger 303 has a head 309 which is slidably sealed in a cylinder 310 by a copper mitre ring 311 and a rubber O ring 312. The head 309 of the plunger 303 has a tail piece 313 which is slidably sealed in passage through the end wall 314 of the cylinder 310 by a copper mitre ring 315 and a rubber O ring 316. A passageway 317 extends axially through the plunger 303, its head 309 and tail piece 313. A passageway 318, for liquid, extending longitudinally through the plunger 303 connects the bore 312 of the container 301 with the cylinder 310 behind the head 309 of the plunger 303.

The other end of the bore 302 of the container 301 is fitted with a plug member 319 which is sealed in the bore 302 by a copper mitre ring 320 and an O ring 321. The plug member 319 has a head 322 which is clamped between the end face 323 of the container 301 and a cross head 324. A longitudinal passageway 325 extends through the plug member 319 and the plug member 319 has associated clamping and sealing means 326. The clamping and sealing means 326 has a conically tapered nose piece 327 integral with the plug member 319. As shown in FIGURE 11 the nose piece 327 is divided by longitudinal slots 328 into four longitudinal segments 329. The segments are enclosed by a rubber sheath 330.

In use of the apparatus for production of tubing a tubular billet 331 has its leading end entered into the container 301 through the passageway 325 in the plug member 317. The rubber sheath 330 of the clamping and sealing means 326 seals about the billet 331 at its point of entry into the bore of the extrusion chamber 301. A mandrel 332 is fitted in the bore of the billet 331. The mandrel 332 extends through the full length of the billet 331 up to its point of entry into the die 304. The mandrel 332 projects beyond the rear end of the billet 331 and is threaded to screw into a locating member 333 which seats in a recess 334 in a mounting plate 335.

Hydraulic liquid 336 is contained in the cylinder 310 behind the head 309 of the plunger 303 and in the bore 312 of the container 301 surrounding the billet 331. The cylinder 310 is loaded by a ram 337 to pressurise the hydraulic liquid 336 in the cylinder 310. The pressure of the hydraulic liquid 336 in the cylinder 310 is transmitted to the hydraulic liquid 336 surrounding the billet 331 in the container 301 through the longitudinal passageway 318 in the plunger 303. The pressure of the liquid 336 in the container 301 acts on the outside of the sheath 330 of the clamping and sealing means 326 to force the sheath 330 into sealing engagement with the billet 331 and to force the segments 329 of the clamping and sealing means 326 radially inwards into clamping engagement with the billet 331. The head 309 of the plunger 303 is dimensioned so that the annular area of its end face which is exposed to the pressure of hydraulic liquid 336 in the cylinder 310 is larger than the full cross sectional area of the bore 302 of the container 301. Thus the plunger 313 is loaded to exert an axial thrust on the billet 331. The pressure of the hydraulic liquid 336 surrounding the leading end of the billet 331 in the container 301 and the axial thrust applied on this length of the billet 331 by the loading of the plunger 303 sets up stress conditions in the billet at the die entry so as to cause extrusion of the billet through the die 304. The billet extrudes through the die 304 about the mandrel 332 to form a tube which passes out through the longitudinal passageway 317 in the plunger 303. As extrusion of the billet proceeds the loading of the plunger 303 causes it to move into the bore 302 of the container 301 and hydraulic liquid 336 is transferred from the bore 302 of the container 301 into the cylinder 310 through the longitudinal passageway 318 in the plunger 303, the plunger 303 moving forward relatively to the movement of the cylinder 310.

When the plunger 303 is fully advanced in the bore 302 of the container 301 extrusion is terminated by release of the loading applied on the cylinder 310 by the ram 337. Thus the pressure of the hydraulic liquid 336 in the cylinder 310 and in the bore 302 of the container 301 is reduced to zero. The reduction of pressure in the liquid 336 within the container 301 releases the clamping and sealing means 326 so that the plunger 303 can be drawn back in the bore 307 of the container 1 and a new length of the billet 331 can be drawn through the plug member 319 into the container 301 for recommencement of extrusion.

Repetition of this process allows extrusion of the full length of the billet 331. The length of tube produced is dependent on the size of billet employed and the use of long thick walled billets enables the production of long lengths of tube. Alternatively tubes of any required length can be produced by the feed of an end to end abutting stream of billets into the apparatus over the mandrel 332. In the case of suitable materials abutting billets become pressure welded together end to end during extrusion or alternatively the billets may be joined end to end by circumferential seam welding before entering the extrusion container 302. Unscrewing of the locating member 333 from the end of the mandrel 332 gives access to the end of the mandrel 332 for feed of successive billets (individually or in an end to end abutting stream) along the mandrel 332. Alternatively billets 331 split along their length may be fitted about the mandrel 332 for feed into the apparatus. After fitting about the mandrel 332 the halves of the billets 331 may be joined by longitudinal seam welding.

The arrangement shown in FIGURES 12a, 12b and 12c of the drawings is of similar construction to the arrangement of FIGURES 10a, 10b and 10c and similar parts are given the same reference numbers in the two arrangements. However in the arrangement of FIGURES 12a, 12b and 12c a tubular mandrel 332 is employed. The arrangement of FIGURES 12a, 12b and 12c is directed to the production of metal sheathed cable. A cable 338 to be clad is fed through the tubular mandrel 332 and the billet 331 is extruded about the cable 338 through the die 304. Long lengths of clad cable (for example up to 600 yards) can be produced by the use of long thick walled billets. Clad cables of any required length can be produced by the successive feed of billets in the apparatus, each billet being joined onto the succeeding billet either by pressure welding during extrusion or alternatively by being prejoined by welding to the succeeding billet before extrusion. Again in this case billets split along their length may be fitted about the mandrel and joined by longitudinal seam welding to form solid tubular billets which are then fed in succession into the apparatus.

As an alternative to the successive feed of solid tubular billets over the mandrel 332 or the use of billets made up from longitudinally welded halves a billet may be formed, as shown in FIGURE 13, by the wrapping of strip material 339 around the mandrel 332. The strip material 339 is for example wound in a helical manner on the mandrel 332 to form a helical seam 340 which is joined by fusion welding, using an argon arc welding torch 341. The mandrel 332 protects the cable 338 from damage by the heat of the welding operation. Alternatively the strip material may be folded around the mandrel 332 to form a longitudinal seam which is joined by welding the abutting edges of the seam.

The arrangement of FIGURES 12a, 12b and 12c may also be used for the production of articles having a solid core surrounded by a metal sheath. For example nuclear reactor fuel elements may be produced comprising a central core of uranium metal or ceramic material such as uranium dioxide, clad in a sheath of stainless steel or other material such as a magnesium or zirconium alloy.

Such articles are produced by feeding a rod of the solid core material through the tubular mandrel 332 whilst extruding a billet of the sheath material about the rod of core material.

I claim:

1. Apparatus for carrying out a hydrostatic extrusion process comprising an extrusion container having a longitudinal bore, an extrusion die sealed in one end of the bore, a plug member sealed in the other end of the bore, said plug member having a longitudinal passageway therethrough for entry of a billet through the plug member into the bore of the extrusion container, means for pressurising liquid in the bore of the container, means for bleeding liquid from the bore of the extrusion container as a billet is extruded through the die, means for clamping the plug member in locked engagement with a billet at its point of entry into the extrusion container through the longitudinal passageway in the plug member, means for sealing between the billet and the end of the plug member inside the bore of the extrusion container, the plug member and the die being movable relatively towards the other along the bore of the extrusion container during extrusion of the billet to accommodate for shortening of the length of the billet in the extrusion container as the billet is extruded.

2. Apparatus for carrying out a hydrostatic extrusion process as claimed in claim 1 wherein the die is in fixed sealed engagement with one end of the bore of the extrusion container and the plug member is slidably sealed in the other end of the bore of the extrusion container, the plug member being movable along the bore of the extrusion container towards the die during extrusion of a billet to accommodate for shortening of the length of the billet in the extrusion container as the billet is extruded.

3. Apparatus for carrying out a hydrostatic extrusion process as claimed in claim 1 wherein the plug member is in fixed sealed engagement with one end of the bore of the extrusion container and the die is slidably sealed in the bore of the extrusion container, the die being movable along the bore of the extrusion container towards the plug member during extrusion of a billet to accommodate for shortening of the length of the billet in the extrusion container as the billet is extruded.

4. Apparatus for carrying out a hydrostatic extrusion process as claimed in claim 1 wherein both the plug member and the die are slidably sealed in the bore of the extrusion container, the plug member and the die being relatively movable towards each other along the bore of the extrusion container during extrusion of a billet to accommodate for shortening of the length of the billet in the extrusion container as the billet is extruded.

5. Apparatus for carrying out a hydrostatic extrusion process comprising an extrusion container having a bore with an extrusion die sealed in one end of the bore, means for pressurisation of a hydraulic liquid in the bore of the extrusion container about a billet when contained therein, a plug member entered into and slidably sealed in the other end of the bore of the extrusion container, means for bleeding hydraulic liquid from the bore of the extrusion container as extrusion of a billet proceeds, a longitudinal passageway being provided through the plug member whereby a billet may be entered into the bore of the extrusion container through the longitudinal passageway in the plug member, means for clamping the plug member in locked engagement about a billet at its point of entry into the extrusion chamber through the longitudinal passageway in the plug member, means for sealing between the billet and the end of the plug member inside the bore of the extrusion container and means for loading the plug member in the bore of the extrusion container towards the die to apply a mechanical axial loading on the length of the billet inside the extrusion container during extrusion of the billet, and so that the plug member is caused to move along the bore of the extrusion container towards the die to accommodate for shortening of the length of the billet in the extrusion container as the billet is extruded.

6. Apparatus for carrying out a hydrostatic extrusion process comprising an extrusion container having a bore with an extrusion die slidably sealed in one end of the bore, means for pressurisation of a hydraulic liquid in the bore of the extrusion container about a billet when contained therein, a plug member fitting and sealed in the other end of the bore of the extrusion container, means for bleeding of hydraulic liquid from the bore of the extrusion container as extrusion of a billet proceeds, said plug member having a longitudinal passageway therethrough for entry of a billet through the plug member into the bore of the extrusion container, means for clamping the plug member in locked engagement about a billet at its point of entry into the bore of the extrusion container through the longitudinal passageway in the plug member, means for sealing between the billet and the rear end of the plug member inside the bore of the extrusion container and means for loading the die in the bore of the extrusion container towards the plug member to apply a mechanical axial loading on the length of the billet inside the extrusion container during extrusion of the billet and so that the die is caused to move along the bore of the extrusion container towards the plug member to accommodate for shortening of the length of the billet in the extrusion container as the billet is extruded.

7. Apparatus for carrying out a hydrostatic extrusion process as claimed in claim 5 wherein the plug member which is slidably sealed in the bore of the extrusion container has a head which is of larger diameter than the diameter of the plug member, the head of the plug member being slidably sealed in a cylinder which is mounted to be movable relative to the extrusion container, the head of the plug member having a cylindrical tail piece of smaller diameter than the head of the plug member, said tail piece extending and being slidably sealed in passage through the end wall of the cylinder, the longitudinal passageway extending through the plug member also extending through the head and tail piece of the plug member, means being provided for loading the cylinder in a direction towards the extrusion container to pressurise hydraulic liquid contained in the cylinder, the area of the head of the plug member exposed to the pressure of hydraulic liquid in the cylinder being at least equal to or greater than the cross sectional area of the bore of the extrusion container.

8. Apparatus for carrying out a hydrostatic extrusion process as claimed in claim 7 wherein the means for bleeding of hydraulic liquid from the bore of the extrusion container as extrusion of a billet proceeds comprises a passageway connecting between the bore of the extrusion container and the cylinder associated with the head of the plug member.

9. Apparatus for carrying out a hydrostatic extrusion process as claimed in claim 6 wherein the extrusion die is carried by a plunger slidably sealed in the bore of the extrusion container said plunger having a passageway therethrough for exit of material extruding through the die, the plunger having a head which is of larger diameter than the diameter of the plunger, the head of the plunger being slidably sealed in a cylinder which is mounted to be movable relative to the extrusion container, the head of the plunger having a cylindrical tail piece of smaller diameter than the head of the plunger, said tail piece extending and being slidably sealed in passage through the end wall of the cylinder, the longitudinal passageway in the plunger also extending through the head and tail piece of the plunger, means being provided for loading the cylinder in a direction towards the extrusion container to pressurise hydraulic liquid contained in the cylinder, the area of the head of the plunger exposed to the pressure of hydraulic liquid in the cylinder being at least equal to or greater than the cross sectional area of the bore of the extrusion container.

10. Apparatus for carrying out a hydrostatic extrusion process as claimed in claim 9 wherein the means for bleeding of hydraulic liquid from the bore of the extrusion container as extrusion of a billet proceeds comprises a passageway connecting between the bore of the extrusion container and the cylinder associated with the head of the plunger.

11. Apparatus for carrying out a hydrostatic extrusion process comprising an extrusion container having a longitudinal bore opening out into a first cylinder of larger diameter than the bore at one end and a second cylinder of large diameter than the bore at the other end, a plug member extending into the bore from the first cylinder, said plug member being slidably sealed in the bore and having a head slidably sealed in the first cylinder, said plug member having a tail piece of smaller diameter than the head of the plug member, the tail piece being slidably sealed in passage out of the end of the first cylinder, the cross sectional area of the head of the plug member exposed in the first cylinder being at least equal to or greater than the cross sectional area of the bore of the extrusion container, a longitudinal passageway being provided through the plug member, its head and tail piece for entry of a billet through said passageway into the bore of the extrusion container, means for clamping the plug member in locked engagement about a billet at its point of entry into the bore of the extrusion container through the longitudinal passageway, means for sealing between the billet and the end of the plug member inside the bore of the extrusion container, a plunger extending into the bore of the extrusion container from the second cylinder, said plunger being slidably sealed in the bore and having a head slidably sealed in the second cylinder, said plunger having a tail piece of smaller diameter than the head of the plunger, the tail piece being slidably sealed in passage out of the end of the second cylinder, the cross sectional area of the head of the plunger exposed in the second cylinder being at least equal to or greater than the cross sectional area of the bore of the extrusion container, a longitudinal outlet passageway being provided through the plunger, its head and tail piece, an extrusion die orifice being defined within said outlet passageway inside the plunger, means for pressurisation of hydraulic liquid in the second cylinder behind the head of the plunger to load the plunger and cause pressurisation of hydraulic liquid surrounding a billet in the bore of the extrusion container and means for transmitting the pressure of hydraulic liquid in the bore of the extrusion container to hydraulic liquid in the first cylinder behind the head of the plug member.

12. Apparatus for carrying out a hydrostatic extrusion process as claimed in claim 1 wherein the means for clamping the plug member in locked engagement with a billet and for sealing between the billet and the end of the plug member inside the bore of the extrusion chamber are provided by the plug member having a conically tapered nose piece fitted with an elastic sealing sleeve which embraces the nose piece and extends beyond the end of the nose piece to grip about a billet when inserted through the longitudinal passageway of the plug member, the nose piece being tapered so as to have a degree of elastic radial flexibility such that the pressure of hydraulic liquid acting in the bore of the extrusion container on the outer surface of the elastic sealing sleeve is sufficient to deform the conically tapered nosepiece radially inwards into clamping engagement with the billet.

13. Apparatus as claimed in claim 12 wherein the nosepiece is divided into segments by being slotted longitudinally.

14. Apparatus for carrying out a hydrostatic extrusion process as claimed in claim 1 adapted for the production of tubing by the provision of a mandrel extending coaxially through the longitudinal passageway in the plug member into the bore of the extrusion container from a point of location outside the extrusion container.

15. Apparatus for carrying out a hydrostatic extrusion process as claimed in claim 1 adapted for the production of articles having a solid core enclosed within a sheath of different material by the provision of a tubular mandrel extending coaxially through the longitudinal passageway in the plug member into the bore of the extrusion container from a point of location outside the extrusion container.

References Cited
UNITED STATES PATENTS

| | | | |
|---|---|---|---|
| 2,558,035 | 6/1951 | Bridgman | 72—60 |
| 3,073,441 | 1/1963 | Priaroggia et al. | 72—270 |
| 3,328,998 | 7/1967 | Sabroff et al. | 72—362 |

RICHARD J. HERBST, *Primary Examiner.*

U.S. Cl. X.R.

72—268, 270